(12) United States Patent
Hammond

(10) Patent No.: US 7,881,285 B1
(45) Date of Patent: *Feb. 1, 2011

(54) EXTENSIBLE INTERACTIVE VOICE RESPONSE

(75) Inventor: Dan Hammond, Dallas, TX (US)

(73) Assignee: Convergys CMG, Utah, Salt Lake City, UT (US)

( * ) Notice: Subject to any disclaimer, the term of this patent is extended or adjusted under 35 U.S.C. 154(b) by 920 days.

This patent is subject to a terminal disclaimer.

(21) Appl. No.: 11/418,751

(22) Filed: May 5, 2006

Related U.S. Application Data

(63) Continuation of application No. 09/705,281, filed on Nov. 3, 2000, now Pat. No. 7,068,643.

(51) Int. Cl.
H04L 12/66 (2006.01)
(52) U.S. Cl. ............... 370/352; 379/88.17; 379/88.18; 707/10; 707/104.1
(58) Field of Classification Search .............. 379/88.17, 379/88.18; 707/10, 104.1
See application file for complete search history.

(56) References Cited

U.S. PATENT DOCUMENTS

| 5,577,100 | A | | 11/1996 | McGregor et al. | |
|---|---|---|---|---|---|
| 5,649,131 | A | * | 7/1997 | Ackerman et al. | 715/744 |
| 5,802,526 | A | * | 9/1998 | Fawcett et al. | 707/104.1 |
| 5,867,661 | A | * | 2/1999 | Bittinger et al. | 709/227 |
| 6,195,357 | B1 | | 2/2001 | Polcyn | |
| 6,198,915 | B1 | | 3/2001 | McGregor et al. | |
| 6,216,104 | B1 | * | 4/2001 | Moshfeghi et al. | 704/260 |
| 7,305,347 | B1 | * | 12/2007 | Joao | 705/1.1 |
| 2003/0187794 | A1 | | 10/2003 | Irwin et al. | |

(Continued)

OTHER PUBLICATIONS

U.S. Appl. No. 09/738,086, filed Dec. 15, 2000, Dan Hammond.

(Continued)

*Primary Examiner*—Duc C Ho
(74) *Attorney, Agent, or Firm*—William S. Morriss; Frost Brown Todd LLC

(57) ABSTRACT

The present invention discloses a system and method for providing interactive voice response (IVR) applications executable on individual communication devices. Unlike current IVR applications that run from centralized voice servers, the present invention describes a system in which communication units initiate communication with a multimedia server over a data network such as the Internet and download extensible copies of voice response applications. The communication device then runs the voice response applications, thus, locally administering the voice messages and accepting the voice or data input from a user. The multimedia server may preferably divide the application software into executable segments to accommodate communication devices with limited memory resources, such as mobile phones and hand-held computers. The system and method may implement different level of complexity by breaking application functionality into modules and the sub-modules. For multi-module applications, the communication units will re-establish communication links with the multimedia server to download each necessary or subsequent module or sub-module. The system and method may also allow users to connect directly to agents or operators to perform tasks that are too complex for efficient automation. The system may connect users and agents using any combination of a data network and voice network. The implementation of the voice response application using the data network connection allows a reduction in the number of telephone ports into an IVR and also allows multiple users to access the IVR over the same line, because of the asynchronous nature of the data network.

22 Claims, 6 Drawing Sheets

U.S. PATENT DOCUMENTS

2003/0202504 A1* 10/2003 Dhara et al. ............... 370/352
2007/0044023 A1  2/2007 Carter et al.
2007/0044026 A1  2/2007 Potter et al.

OTHER PUBLICATIONS

Office Action dated May 12, 2010 for U.S. Appl. No. 10/853,092.
Final Office Action dated Jul. 13, 2010 for U.S. Appl. No. 11/198,934.
Office Action dated Jun. 23, 2010 for U.S. Appl. No. 10/392,496.
Final Office Action issued against U.S. Appl. No. 11/198,934 dated Jul. 13, 2010.
Office Action issued against U.S. Appl. No. 10/392,496 dated Jun. 23, 2010.
Office Action issued against U.S. Appl. No. 10/853,092 dated May 12, 2010.
Office Action issued against U.S. Appl. No. 11/198,934 dated Dec. 24, 2009.
Final Office Action issued against U.S. Appl. No. 10/853,092 dated Sep. 18, 2009.
Office Action issued against U.S. Appl. No. 11/044,848 dated Jul. 22, 2009.
Final Office Action issued against U.S. Appl. No. 10/392,496 dated Apr. 27, 2009.
Final Office Action issued against U.S. Appl. No. 10/853,092 dated Mar. 26, 2009.
Final Office Action issued against U.S. Appl. No. 10/853,092 dated Mar. 13, 2009.
Final Office Action issued against U.S. Appl. No. 11/044,848 dated Feb. 4, 2009.
Office Action issued against U.S. Appl. No. 10/392,496 dated Oct. 28, 2008.
Office Action issued against U.S. Appl. No. 11/044,848 dated Aug. 1, 2008.
Final Office Action issued against U.S. Appl. No. 10/392,496 dated Apr. 4, 2008.
Office Action issued against U.S. Appl. No. 10/853,092 dated Feb. 15, 2008.
Office Action issued against U.S. Appl. No. 10/392,496 dated Nov. 1, 2007.
U.S. Appl. No. 60/743,764, filed Mar. 24, 2006; Irwin et al.
U.S. Appl. No. 60/738,325, filed Nov. 18, 2005; Irwin et al.
U.S. Appl. No. 60/559,120, filed Aug. 5, 2004; Claridge et al.
U.S. Appl. No. 60/559,365, filed Apr. 2, 2004; Irwin et al.
U.S. Appl. No. 60/550,556, filed Mar. 5, 2004; Irwin et al.
U.S. Appl. No. 60/540,855, filed Jan. 29, 2004; Irwin et al.
U.S. Appl. No. 60/523,346, filed Nov. 19, 2003; Irwin et al.
U.S. Appl. No. 60/414,122, filed Sep. 27, 2002; Irwin et al.
U.S. Appl. No. 60/375,455, filed Apr. 25, 2002; Irwin et al.
U.S. Appl. No. 60/367,964, filed Mar. 27, 2002; Irwin et al.

* cited by examiner

EXTENSIBLE INTERACTIVE VOICE RESPONSE

CROSS-REFERENCE TO RELATED APPLICATIONS

This is a continuing application of application Ser. No. 09/705,281, entitled, "EXTENSIBLE INTERACTIVE VOICE RESPONSE," filed Nov. 3, 2000, the disclosure of which is hereby incorporated herein by reference thereto. Reference is hereby made to the following co-pending, commonly assigned, U.S. patent applications: Ser. No. 08/719,163, entitled, "INTERACTIVE INFORMATION TRANSACTION PROCESSING SYSTEM WITH UNIVERSAL TELEPHONY GATEWAY CAPABILITIES," the disclosure of which is incorporated herein by reference.

TECHNICAL FIELD

This invention relates to interactive voice response systems and, more particularly, to a voice response system that has the capability of being extended for local execution on a telephone unit or communication device.

BACKGROUND

Interactive voice response systems (IVRs) are well-known and well-used by corporations and governmental entities alike. In many popular applications, IVRs allow such entities to handle numerous incoming calls from consumers, employees, or constituents without requiring a prohibitively expensive number of phone operators. Companies may typically conserve operator resources for use with only the most complex tasks by off-loading simple informational tasks to the automated IVRs.

For example, the banking industry has made great use of IVR technology to conserve and reduce the expense of operator resources. Many bank customers call into a bank to find out simple items of information, such as account balance and last recorded deposits or withdrawals. This type of information is easily retrieved using the bank's database. An IVR may generally be programmed to answer the customer's phone call, determine the complexity of the information desired by the customer and then either present such simple retrieved information as account balance or account activity to the user using synthesized or pre-recorded voice messages, or transfer the customer to a live operator to handle the more complex tasks. This automation of the simple tasks relieves the operators from inefficient application and conserves their resource for the more complex tasks.

In general, modern IVRs were developed during the evolution and advancement of telecommunication networks and equipment. In early networks, most calling service functionality was built into telephone switches. However, because of the enormous expense of telephone switches, advances in calling services were typically delayed until the scheduled addition of new switches and/or replacement or upgrade of existing switches. Service providers typically had to wait until the equipment manufacturers determined the appropriate time to add such calling service functionality to the switches. This limitation generally prevented individual service providers from offering competitive or innovative features without most other providers offering the same switch-resident features.

As switching technology became more and more computerized, computers were connected to the switches and given portions of telephone services to perform in conjunction with the switches. The extension of telephone network functionality to these peripheral computers created an intelligent network (IN) allowing many of the functions previously executed by the switches to be performed by the peripheral computers. As more of the telephone services and functionality was extended to the peripheral computers, the new network architecture was renamed advanced intelligent network (AIN) architecture. The development of AIN architecture generally increased the availability of calling services, such as call waiting, call forwarding, and even interactive voice response. The services, thus, began to move from large and expensive telecommunication switches, to the new telephone system integrated computers now designated service control points (SCPs), intelligent peripherals (IPs), and service nodes (SNs).

SCPs and IPs are basically different hierarchical layers of the peripheral computers that were connected and integrated with the switching network. SCPs and IPs typically have call switching functionality, but also have the processing power to handle user voice and data input and make decisions based on this user input. Switches generally route calls to SCPs, which use IPs to perform many of the simple tasks, such as voice prompting or digit collection. In contrast, SNs are self-contained service providers that typically operate autonomously. A switch routes a call to an SN for services such as voicemail or fax server, which the SN performs without further delegation or input from the switch. Thus, much of the calling service functionality has been extended to peripheral computer/servers external to the switches in the AIN architecture.

Most IVRs are connected into the public switched telephone network (PSTN) in order to facilitate their call handling functions. With the increase in asynchronous communication facilities, such as the internet protocol (IP) network, IVRs will need to include the capability of providing voice response services to such asynchronous communication formats as voice over IP (VoIP). One such IVR system is disclosed in the aforementioned co-pending application entitled, "INTERACTIVE INFORMATION TRANSACTION PROCESSING SYSTEM WITH UNIVERSAL TELEPHONY GATEWAY CAPABILITIES." However, because VoIP and other asynchronous telecommunication formats are not yet widespread, the majority of IVR applications are still overwhelmingly synchronous and connect to the PSTN.

IVR capacity is typically limited by the number of ports installed in the system. The ports connect the IVR to the PSTN. For example, an IVR manufactured with only one port, may only be able to handle one phone call at a time. Because telephone calls on the PSTN are typically circuit-switched, synchronous connections, an entire circuit path is reserved for the phone connection for the duration of the call. Even when nothing is being transmitted between callers, the circuit generally remains open and, thus, a connected IVR port will usually remain busy for the duration of the call or, at least, the duration of the voice application executed by the IVR. Once the voice response application has been completed, with the phone call either handled or forwarded to the appropriate employee or agent, the IVR may be able to answer the next call as soon as the port is made available. Therefore, IVRs are generally manufactured and customized according to the buyer's expected call traffic.

Typically, IVRs are more expensive with more ports added to the system. Large capacity systems are, thus, usually more easily afforded by larger companies. However, even large companies may not generally be willing to spend a very large sum of money for an IVR system with the total number of ports required to handle the company's expected peek call volume. Thus, IVRs are typically purchased considering only average call volumes. While many consumer's calls will be answered by these IVRs, there will still be occasions when the consumer's call is placed on hold for a long time, or, even worse, the call is not answered at all.

Another disadvantage of the necessity of holding ports and circuits open is the expense generally connected with the open telephone circuit, especially when a wireless telephone is connected to a traditional IVR application. While the cost of wireless communication is falling, users still typically pay to connect to the wireless network, even for calls to the user.

In consideration of the limitations of the current technology in IVRs, it would be desirable to have an IVR application that did not have a capacity limited by the number of ports installed on the IVR system.

It would be a further advantage to have an IVR system that was not required to maintain a circuit connection between the calls and the calling service.

SUMMARY OF THE INVENTION

The present invention is directed to a system and method for an extensible interactive voice response application comprising an application server having application logic and information stored thereon. The application logic is used for defining at least one voice response application resident on the server. The system also works in conjunction with communication devices for establishing connections with the application server. According to a preferred embodiment of the present invention, when a communication device initiates its connection with the application server, the server downloads application logic, or portions thereof, to the communication device to facilitate operation of IVR functions on the communication device. The preferred embodiment application logic may define operations including voice play and/or record, text-to-speech, voice recognition, dual tone multiple frequency (DTMF) input, and/or display multimedia output. Accordingly, the communication device should preferably include memory and a processor capable of executing the downloaded application logic and locally administering the particular voice response application. It should be noted, of course, that application logic of the present invention may select or enable particular operations based on the feature set of the particular communication device. Similarly, the application logic may be provided to the communication device in modules or executable portions to accommodate limitations of the communication device's resources and/or to provide efficient operation.

As the communication device executes the voice response application, it may play audible voice cues according to the particular application. A user may enter responses to the voice cues by speaking or entering information using DTMF or other data input format. Depending on the users responses and requests, the communication device may speak or display responsive information to the user. The responsive information may preferably have been downloaded along with the application logic or, after the communication device re-establishes a connection, may be retrieved from the application server through internal or external sources.

Interaction of the caller and the application logic may provide functionality such as that of a more typical voice response unit (VRU), i.e., a caller may retrieve banking information without requiring the service provider to dedicate ports to the particular callers. Moreover, the interaction of the caller and the application logic may provide heretofore unavailable functionality. For example, application logic of a preferred embodiment of the present invention may define an Internet voice browsing session allowing a caller to freely access any information available over the Internet from a communication device such as a mobile or landline telephone.

The implementation of a preferred embodiment of the present invention provides several potential benefits over existing IVR systems. Speech recognition and voice processing executed on the communication device in the preferred embodiment will preferably provide more accurate results due to the voice input being provided at the source of the processing. Furthermore, with the local processing, delay time is preferably reduced. The extensible IVR system is advantageously more scalable than traditional IVR systems because the extensible system does not rely on IVR ports to control, and limit, capacity. Moreover, the extensible IVR system leverages the existing IP infrastructure, which continues incredible growth due to the recent explosion in Internet accessibility demand.

In addition, the remote communication devices may remain in communication with the application server without tying up an expensive port, or otherwise precluding another communication device from accessing application server. Thus, processing and system interaction may be going on with several communication devices at the same time. For example, a mobile phone may remain in communication with the server through a suspended socket connection to implement the voice response application. At the same time, one or more other mobile or landline phones (or any other compatible communication device) may preferably be downloading or interacting with the server through other asynchronous, multiplexed socket connections on the same line. At any required time, the mobile phone with the suspended socket connection may re-activate the suspended connection to interact further with the server without requiring the suspension or deactivation of the other connections.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
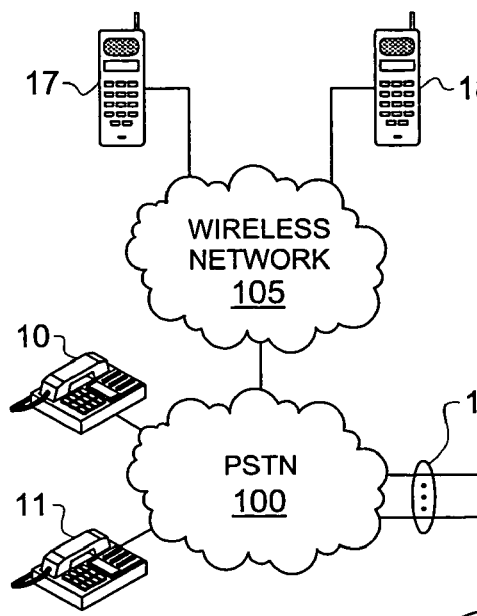
FIG. 1 is a high-level block diagram illustrating a prior art IVR system.

FIG. 1 illustrates a typical prior art IVR system. Customers usually call into IVR 102 over PSTN 100 using traditional telephones 10 and 11, or standard mobile phones 17 and 18 over wireless network 105 connected through PSTN 100. IVR 102 is typically connected to PSTN 100 using trunk 107, which generally comprises a collection of individual phone lines usually corresponding to the number of ports available on IVR 102. As customers call into the system, IVR 102 answers the calls and runs a voice response application for each caller. IVR 102 plays pre-recorded or synthesized voice messages and voice prompts, obtains input from the caller either through DTMF or spoken responses. Each voice message is played by IVR 102 and transmitted across PSTN 100 or PSTN 100 and wireless network 105 to the caller at any of phones 11 and 12 or mobile phones 17 and 18.

In the operation of the voice response application, IVR 102 will generally search database 104 for information responsive to requests made by the caller. In the example given above of the banking application, a caller could request to know the available balance of his/her account. IVR 102 would typically receive and interpret the request from the caller, and then search database 104 for the account balance using input from the caller, such as account number, password, etc. When IVR 102 finds the responsive data, it generally audibly communicates the account information to the caller. In order to communicate the responsive information to the caller, IVR 102 may either play pre-recorded voice messages or use synthesized text-to-speech technology. The technique used will usually be determined by the programming and capabilities of IVR 102.

For complex interactions, IVR 102 generally forwards a caller to an agent or employee typically stationed at a computer-telephone integrated workstation (not shown). Once the caller has been forwarded to the agent or employee, the port into IVR 102, on which the caller interacted with the voice response application, will usually be released and available to take the next call.

Figure 2A:
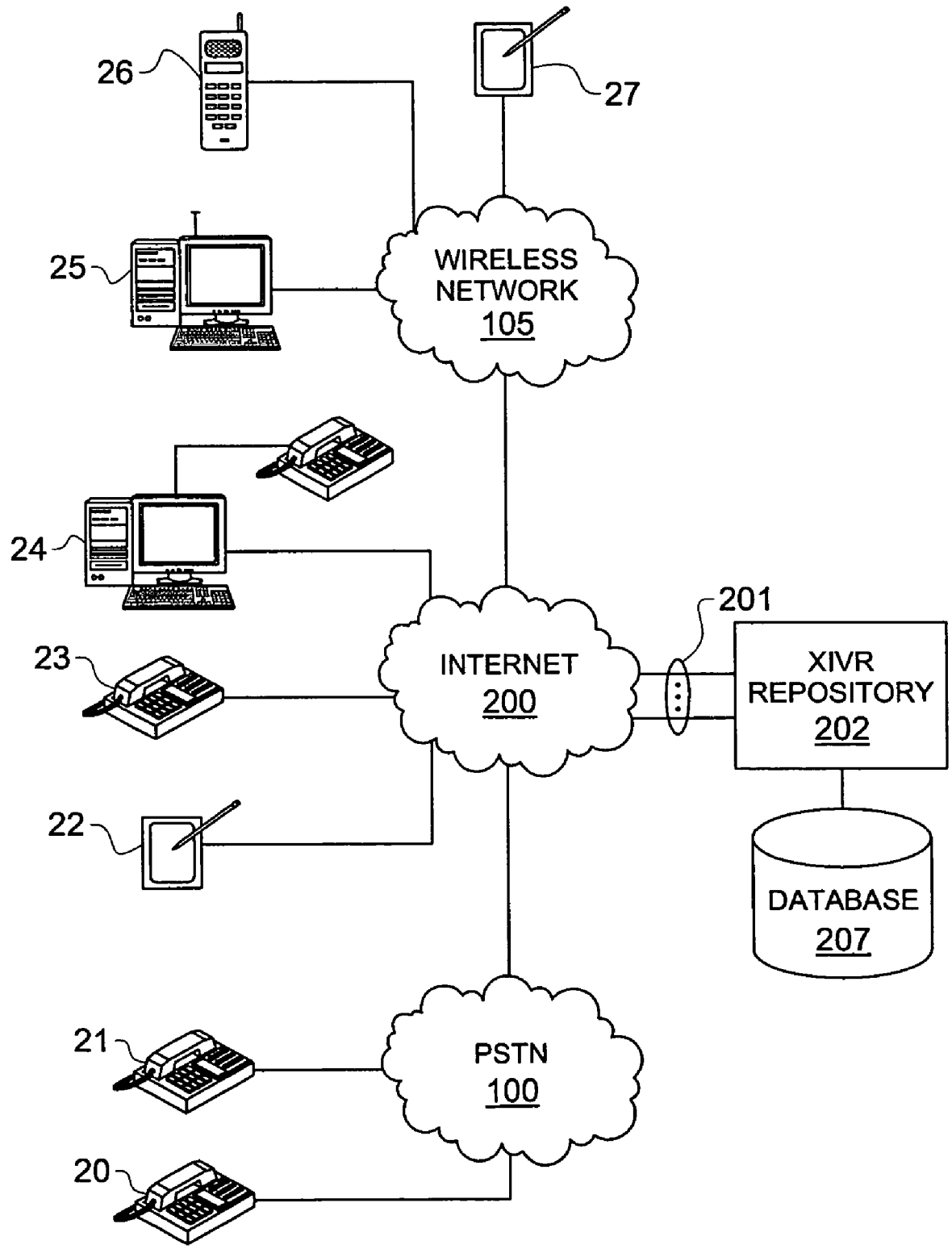
FIG. 2A is a high-level block diagram illustrating a preferred embodiment of the present invention.

FIG. 2A illustrates an eXtensible IVR (XIVR) system according to a preferred embodiment of the present invention. The concept of an extensible system is based on running a system application, or portions thereof, on an external device. In the context of an IVR, an XIVR allows the voice response application to run locally on the accessing communication devices. In order for an XIVR system to operate, the accessing communication devices should preferably have, or have access to, basic processing capabilities and memory for storing the executable application logic.

In the preferred embodiment of the present invention shown in FIG. 2A, XIVR server 202 is connected to a data network, Internet 200, using data connections 201. "Callers" preferably access the system through an asynchronous data network, such as Internet 200. The access may be implemented in any manner available to access Internet 200. For wireless users, a "caller" may access XIVR server 202 using mobile phone 26, laptop computer 25, with wireless modem capabilities, and/or hand-held computer 27, also with wireless communication ability. The wireless users preferably connect to Internet 200 over wireless network 105, and then to XIVR server 202 over data connections 201. Users may also preferably access XIVR server 202 through direct connections to Internet 200 using computer 24, internet telephone 23, and/or hand-held computer 22; or may connect to Internet 200 via PSTN 100 using compatible phones 20 and 21.

Through its connection to Internet 200, XIVR server 202 may be addressed using an Internet protocol (IP) layer address or uniform resource locator (URL). As users access XIVR server 202, server 202 preferably downloads the voice response application logic, or portions thereof, to the user's communication device. Because the connection is made through Internet 200 and data connections 201, all data is advantageously transmitted asynchronously between XIVR server 202 and the user's communication device. This preferably allows more than one user to be connected to XIVR server 202 at the same time over a single line of data connections 201, thus preferably reducing the total number of data connections per user generally required for XIVR server 202.

Once the application logic has been downloaded, the communication device preferably runs the application locally. Using mobile phone 26 as an example, XIVR server 202 downloads the application logic, or portions thereof, to mobile phone 26. When the application logic has been downloaded, the socket connection with XIVR server 202 is either closed or suspended pending any further interaction with XIVR server 202. Mobile phone 26 then runs the application. Alternatively, mobile phone 26 may begin running the voice response application before the application logic, or portions thereof, is completely downloaded. Additionally or alternatively, initial portions of the voice response session may preferably come from XIVR server 202 directly, while the application is loading to mobile phone 26. Such features would preferably allow a more seamless interface with the user. Voice messages and prompts are preferably played for the user directly over mobile phone 26's speaker. The user may respond as usual to the voice messages and prompts.

In the preferred embodiment of the present invention, the user's responses will preferably be processed at mobile phone 26. Therefore, the user's response messages will not have to be transmitted back to XIVR server 202, subjecting the audio to signal degradation caused by the noise injection typical in such transmission. Alternatively, mobile phone 26 may transmit all or some inputs from the user to XIVR server 202 for processing. For example, menu navigation responses may be processed locally, while the ultimate request for data is processed at XIVR server 202 or other coupled systems.

For simple applications, the downloaded application logic may preferably include a table or small database of various optional answer messages for the voice application to use. For example, with a movie-times voice application, the different movie selections and times may be included in the application logic initially downloaded to mobile phone 26. Therefore, when a user requests the times for a particular movie at a particular theater, the voice application locally runs through a look-up table downloaded with the application logic to find and play the corresponding start times for the requested movie. Depending on the XIVR application or the memory considerations used when designing the system, the answer messages may comprise any combination of graphics, text, or aural information. The visual information, i.e., graphics and text, may preferably be presented on a communication device's display, while the aural information may preferably comprise digitized, pre-recorded voice files and/or data files used with text-to-speech synthesis within the application logic or within the host communication device. The aural information may preferably be presented to the user on a resident speaker or other transducing mechanism.

For more complex applications, or applications that handle sensitive data, such as financial information, mobile phone 26 would preferably establish additional, subsequent connections, or simply re-activate a "suspended" socket connection to XIVR server 202 in order to retrieve the requested information. Referring again to the banking example, after the user requests balance information, mobile phone 26 preferably processes the verbal response, determines the action requested, and then preferably accesses the socket connection to XIVR server 202 again. Because the next connection is to obtain further information corresponding to the downloaded voice response application, a code may preferably be added to the header of the data transmission indicating to XIVR server 202 that the following socket connection is a "continued" connection. This code advantageously prevents XIVR server 202 from attempting to download the initial application logic again.

The data transmitted from mobile phone 26 would also preferably contain the processed request from the user to obtain the user's account balance. XIVR server 202 preferably uses the request and other transmitted user input to find the account information in database 207. XIVR server 202 will then preferably package the responsive information and send it back to mobile phone 26 for presentation to the user. The packaged response may preferably be encrypted and may comprise an audio file for playback on mobile phone 26's audio player, a text file for use in a text-to-speech synthesis process at mobile phone 26, and/or text or graphics files for visual presentation on mobile phone 26's display. Thus, for all requested information that is not downloaded along with the downloaded application logic, mobile phone 26 will re-establish the data connection with XIVR server 202 to obtain the appropriate responsive information.

Extensible voice response applications preferably may also call other applications resident on XIVR server 202, or otherwise coupled thereto, as a part of the voice application processing. For example, a stock brokerage application may have several different and extensible functions available for a user to access. However, downloading the entire application may be prohibitively time and resource consuming, for communication devices with limited memory and/or processing capabilities, such as mobile phone 26 and the like. Furthermore, not every user will want to execute all available functions. Therefore, it would be a more efficient use of memory and of the available bandwidth between the communication device and XIVR server 202 to only load portions of a complete voice response application. In such an application, the different functions may preferably be broken into different executable modules corresponding to available features. Thus, the first downloaded module may preferably include only the functions necessary to check balances and stock prices. It may also have options to buy and sell stocks. When a user selects the option to sell stocks, the downloaded application logic preferably causes mobile phone 26 to re-establish or unsuspend the socket connection with XIVR server 202 to download the "sell" module. The sell module will preferably replace the initial module in mobile phone 26 and execute its voice messaging and functionality in a similar manner.

With regard to memory resources, it should be noted that a preferred embodiment of the present invention would advantageously manage the application logic stored on XIVR server 202 in accordance with the memory limitations of the particular communication device connecting to the system. XIVR server 202 would preferably include software to break down the application logic modules into appropriately-sized sub-modules suitable for running on the limited-memory devices, such as mobile phone 26 or hand-held computers 22 and 27. The system would preferably be able to read the type of connected device through the header data of the connection packets transmitted from the communication device. Upon connection and recognition of a limited-memory device, such as hand-held computer 27, XIVR server 202 preferably downloads the first executable sub-module sized according to the memory limitations of hand-held computer 27. As the user completes execution of the first sub-module, hand-held computer 27 accesses the data connection socket with XIVR server 202 and preferably downloads the next executable sub-module. This paging sequence would preferably continue until the application is ended, either by the user or the system.

In an alternative embodiment of the present invention, there may be a desire to connect a user with an agent to handle complex matters or if the user simply desires to speak with a live person. To handle the live agent or operator situation, the voice response application may include a script to establish a voice connection or voice call between the user and an agent. As the script is accessed, the communication device will connect with an agent using the information from within the downloaded application.

In a further alternative embodiment of the present invention, XIVR server 202 may directly connect an agent to a user by incorporating the universal gateway capabilities of the aforementioned, co-pending, commonly assigned application entitled, "INTERACTIVE INFORMATION TRANSACTION PROCESSING SYSTEM WITH UNIVERSAL TELEPHONY GATEWAY CAPABILITIES." XIVR server 202 may preferably directly connect a user using either a synchronous or asynchronous voice-connection with an agent also using either a synchronous or asynchronous voice-connection. The capabilities described in the above-styled application allows for direct connection of the dissimilar connection types.

Figure 2B:
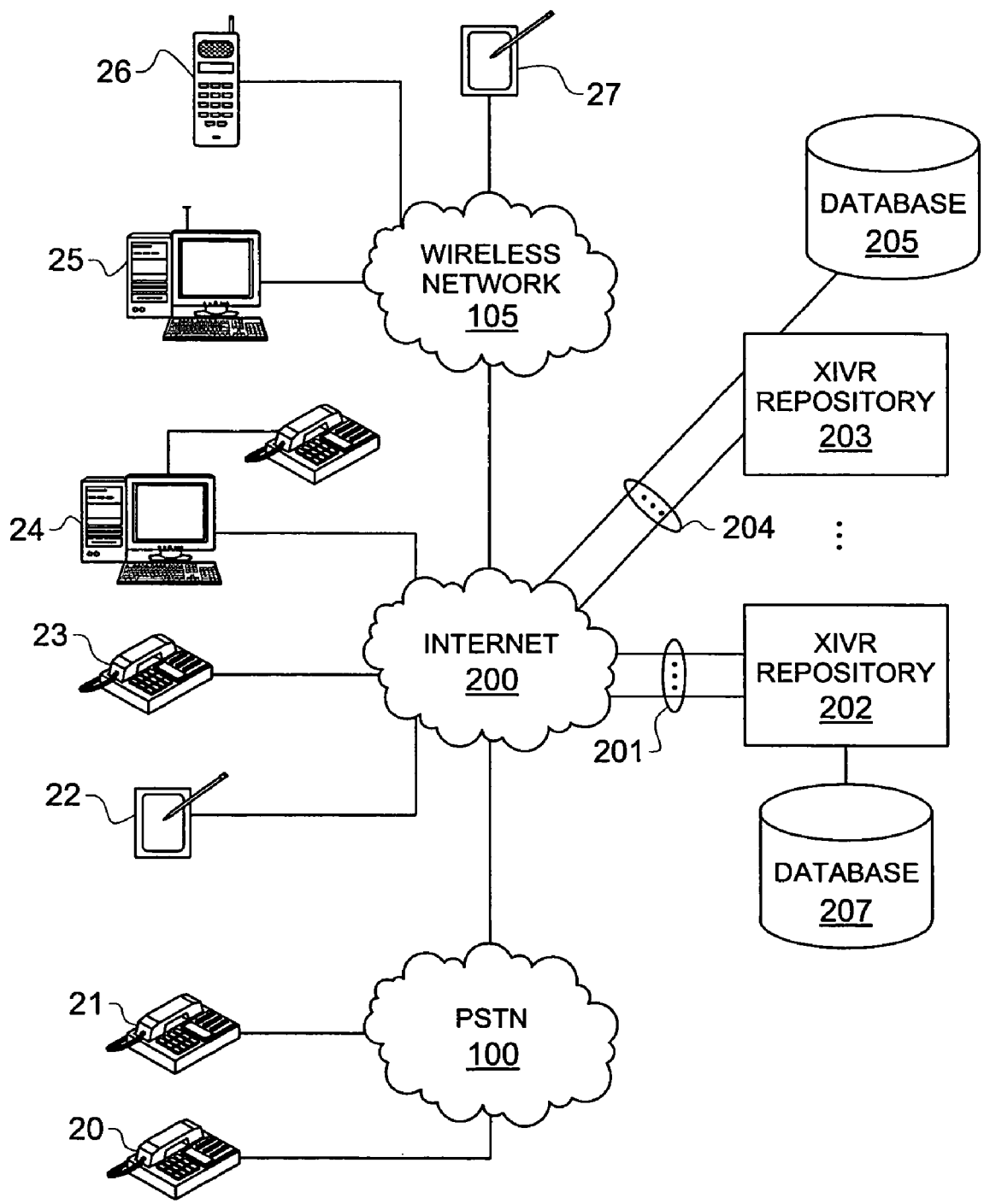
FIG. 2B is a high-level block diagram illustrating a preferred embodiment of the present invention showing multiple XIVR servers.

In operation of an alternative embodiment of the present invention, a caller may begin an interactive voice response session with one XIVR and then hyperlink to another XIVR to execute or operate another voice application. FIG. 2B illustrates the alternative embodiment of the present invention in which voice application hyperlinking may be used.

For example, a caller using landline phone 21 may preferably access XIVR server 202 over data links 201 to begin receiving the program code to operate a first voice response application. During the course of running the first application, the caller may preferably be presented a choice or given a hyperlink option to go to a second XIVR to run another voice response application. With reference to the banking example, the first application may give the user an option to open a brokerage account with a related brokerage company. On choosing this option, landline phone 21 preferably establishes a connection with XIVR server 203 over Internet 200 using data connections 204. XIVR server 203 preferably downloads the application logic to landline phone 21 for running the brokerage account voice response application. The caller would then preferably interact with the brokerage account application running on landline phone 21, which will then communicate the response data and any other necessary information for opening the brokerage account with XIVR server 203. Server 203 will also preferably communicate with database 205 to store and retrieve information needed by landline phone 21 to further operate and complete the brokerage account application.

Figure 2C:
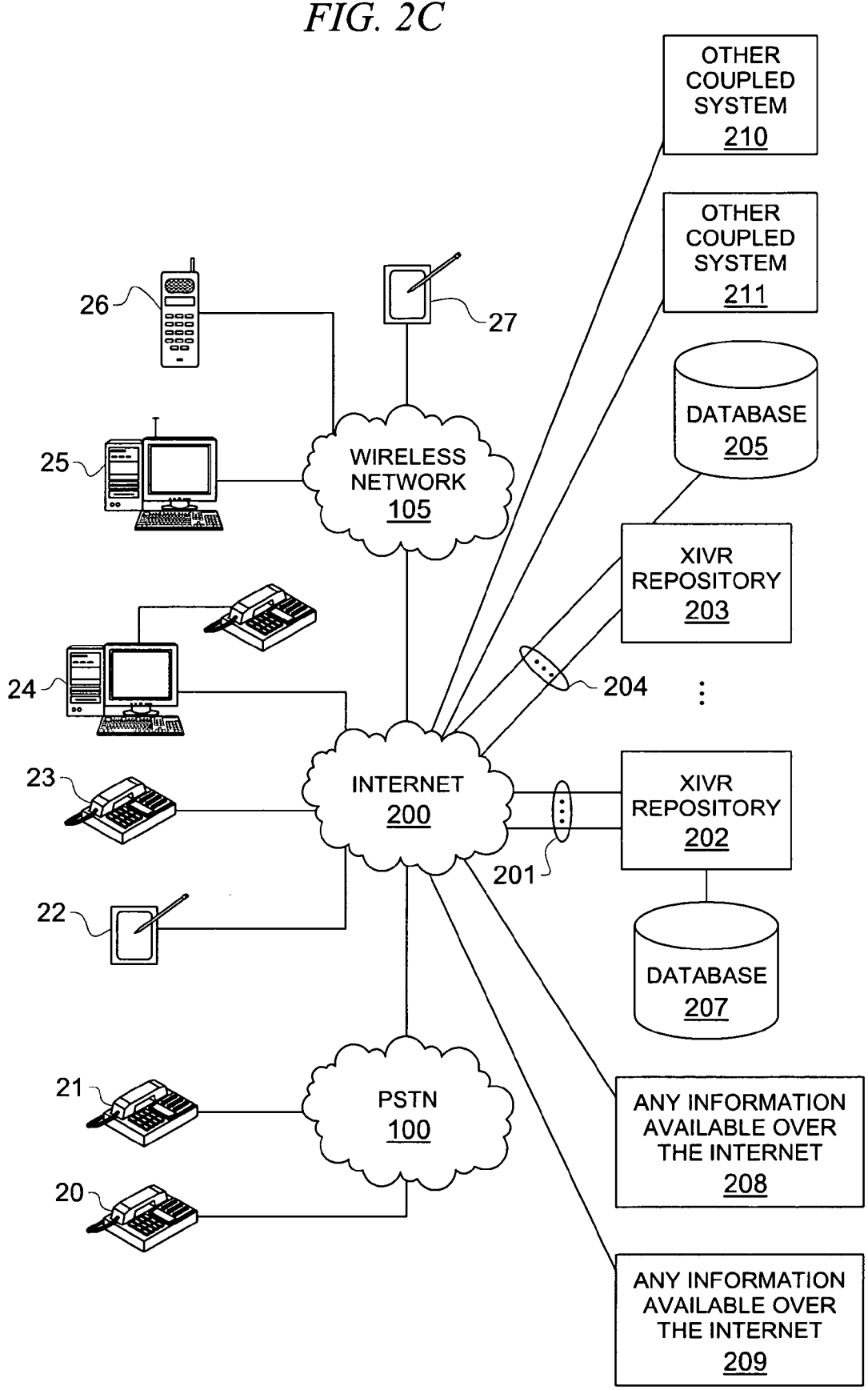
FIG. 2C is a high-level block diagram illustrating an alternative embodiment of the present invention.

FIG. 2C is a block diagram illustrating an alternative embodiment of the present invention. The interaction of the caller and the application logic may provide heretofore unavailable functionality. For example, application logic of a preferred embodiment of the present invention may define an Internet voice browsing session allowing a caller to freely access Any Information Available Over the Internet 208-209 from a communication device such as mobile or landline telephone 26, 20, and 21, respectively. Mobile phone 26 may transmit all or some inputs from the user to XIVR server 202 for processing. For example, menu navigation responses may be processed locally, while the ultimate request for data is processed at XIVR server 202 or Other Coupled Systems 210-211.

Figure 3:
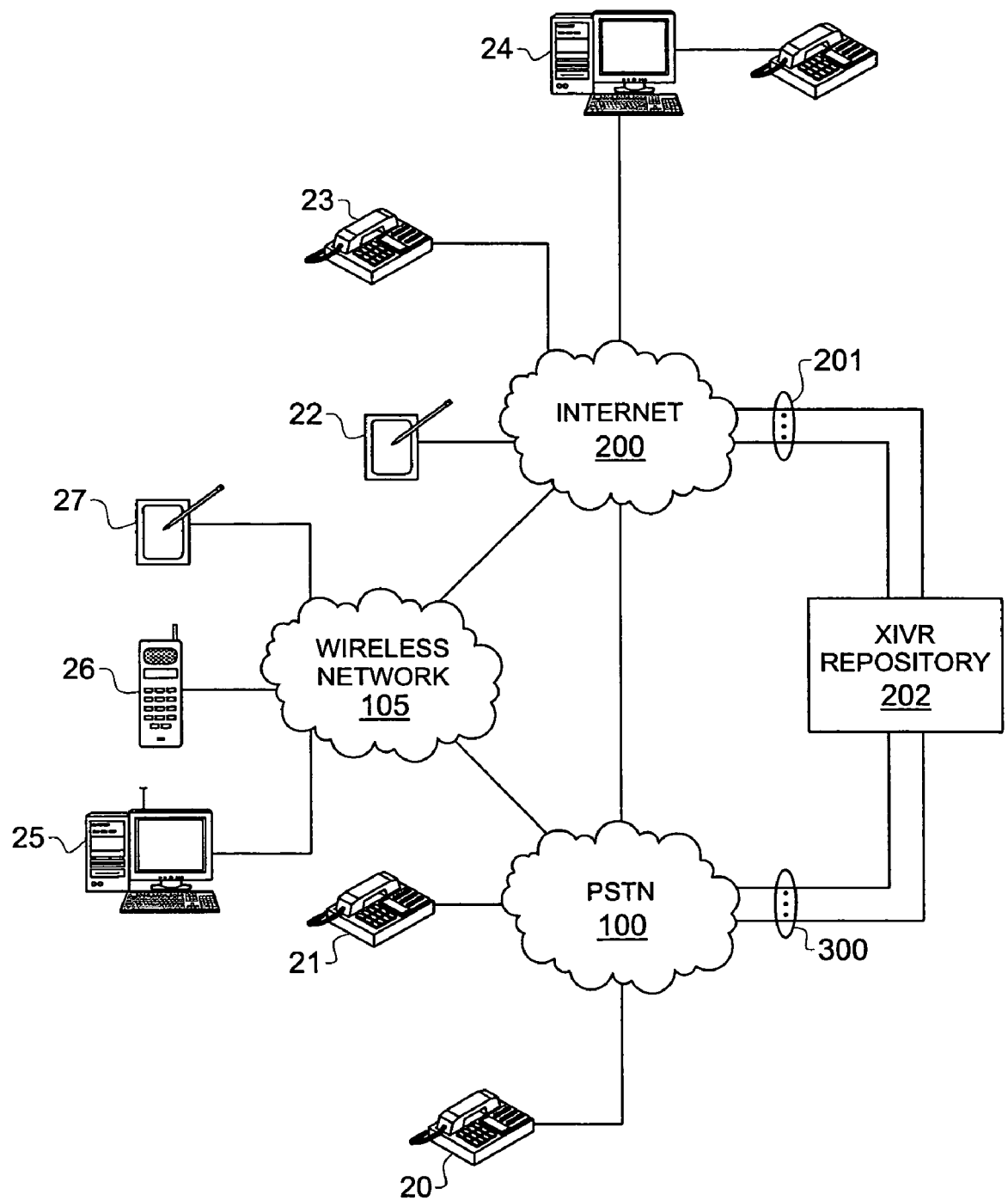
FIG. 3 is a high-level block diagram illustrating an alternative embodiment of the present invention.

FIG. 3 illustrates an alternative embodiment of the present invention configured to initiate a connection with the inventive XIVR 202 using a voice/phone connection. Typical operation of prior art IVR systems begins with a user establishing a voice connection to the IVR. The present alternative embodiment uses a voice connection to initiate the XIVR system. The system is preferably accessed using any one of communication devices 20-27. To initiate the system, the communication device, e.g., mobile phone 26, places a voice call to XIVR server 202. The wireless connection is processed from wireless network 105 through PSTN 100 to XIVR server 202 using trunk 300. Trunk 300 connects to traditional ports preferably included on XIVR server 202.

In operation, mobile phone 26 preferably voice-connects to XIVR server 202, which initiates a preliminary voice response script. Preferably, through this initial script, all necessary information regarding the target address of mobile phone 26 is advantageously established. Such address information may be gathered either automatically, through calling data such as automatic number identification (ANI), dialed number identification service (DNIS), mobile identification number (MIN), or the equipment serial number (ESN), or manually through question and answer sequences with the user. This initial script may additionally or alternatively solicit information with respect to an application a caller wishes or needs to be implemented by XIVR server 202. It should also be noted that XIVR server 202 may have a database of caller associated data. Such a database may contain caller specific information such as IP address or other data information used in establishing the data connection. XIVR server 202 may then use the calling data, such as the ANI, DNIS, MIN and/or ESN, to cross-reference the database for the appropriate connection address information. Once the address information has been determined, XIVR server 202 preferably establishes a data socket connection and begins downloading the appropriate modules or sub-modules of the application logic to mobile phone 26 over Internet 200 and wireless network 105 through data connections 201. In order to minimize the delay, the application logic may preferably begin executing on mobile phone 26 prior to the completion of the initial download. This advantageously presents a more linear interface with the user.

It should be noted that while the foregoing examples noted use of mobile phone 26 for the inventive system, the present invention is not limited to operation solely with mobile communication devices. Landline phones 20 and 21 may preferably access and execute the extensible voice response applications from XIVR server 202 using PSTN 100 and Internet 200 networks to establish a data connection. Moreover, other communication devices such as hand-held computers and desktop or laptop computers may also be used with a preferred embodiment of the present invention.

It should be noted that in the alternative embodiment shown in FIG. 3, XIVR server 202 may preferably use simultaneous, or duplexed voice and data connections with communication devices 20-27. This would preferably allow XIVR server 202 to simultaneously, or nearly simultaneously, execute the preliminary voice response script while downloading the application logic to the communication device. For example, phone 21 connecting to XIVR server 202 and Internet 200 using PSTN 100 may preferably maintain simultaneous voice and data connections with XIVR server 202 if the user subscribes to digital subscriber line (DSL) technology. Wireless communication devices 25-27 may preferably duplex between voice and data connections with XIVR server 202, under the current mobile communication systems, such as the time division-based global system for mobile communications (GSM) and the digital code division multiple access (CDMA) systems. In the near future, however, mobile systems will preferably support a simultaneous data and voice connection to XIVR server 202. The contemplated Third Generation (3G) systems which will utilize developing standards, such as wideband CDMA (WCDMA), and general packet radio service (GPRS), which will overlay a packet-switched network onto the GSM and other time division based systems, each support simultaneous voice and data connections.

Figure 4:
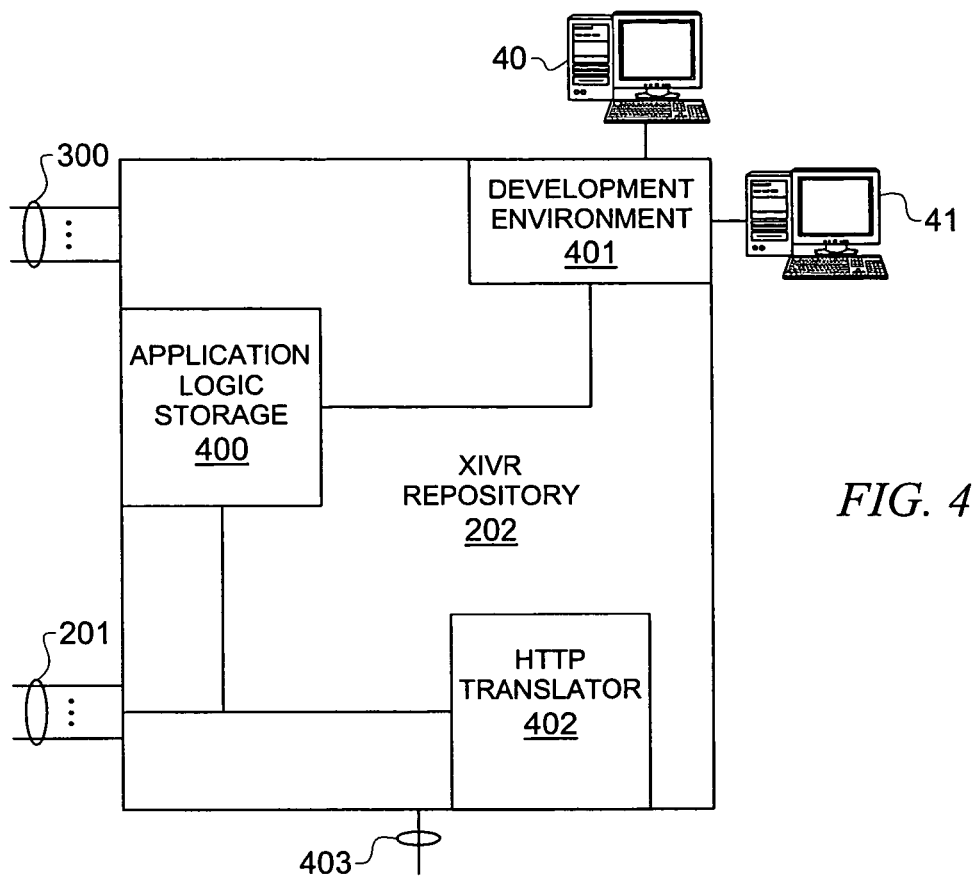
FIG. 4 is a high-level block diagram illustrating the internal operation of an extensible IVR designed according to a preferred embodiment of the present invention.

FIG. 4 shows the unique internal structures of an XIVR server of the preferred embodiment of the present invention. XIVR server 202 preferably extends traditional IVR functionality to each connecting communication device. In an alternative embodiment, XIVR server 202 also preferably provides traditional IVR functionality in order to facilitate the extensible application capability. Thus, XIVR server 202 comprises much of the same equipment found in traditional IVRs (equipment not shown). However, novel features of XIVR server 202 provide the ability to transport voice response functionality to external devices.

Application logic storage 400 preferably comprises memory to store the executable voice response applications. As XIVR server 202 is contacted through PSTN trunk 300 or data connections 201, executable copies of the application logic are preferably downloaded over data connections 201 to the contacting communication units. The voice response applications are advantageously developed with development environment 401 through computer workstations 40 and/or 41. Unlike traditional IVRs, which may be programmed in proprietary languages generally requiring resident interpreters or compilers, the XIVR system preferably uses an extensible language, which is advantageously transferable to a host processor with the components used to run the given application. Languages such as hypertext markup language (HTML), extensible markup language (XML), VoiceXML, and the like may be utilized in providing the extensibility to program voice response applications for use with XIVR server 202.

In an alternative embodiment described further below, XIVR server 202 may also preferably facilitate voice-browsing the Internet. In order to accomplish this function, XIVR server 202 also preferably comprises HTTP translator 402 (FIG. 4). As XIVR server 202 browses through the Internet, it reads the HTML web pages and advantageously converts the HTML into a compatible format for a voice response application, such as VoiceXML for example, and/or for interfacing with callers through various ones of communication devices 20-27. The HTTP is then preferably converted into the appropriate transport protocol and the web pages, or portions thereof, are downloaded to the connecting communication device. The translation executed by HTTP translator 402 preferably converts text-to-speech and notes hyperlinks as special voice cues to inform users of the executable links available. Additionally or alternatively, portions of the web site may be visually presented as text or graphics on a display associated with or connected to the communication device. These conversion components are advantageously included in the application logic downloaded to the connecting devices.

It should be also noted that web sites or web pages may preferably be implement using a compatible extensible voice programming language, such as VoiceXML. Therefore the XIVR system may not always be required to perform translation of incompatible formats or protocols.

Figure 5:
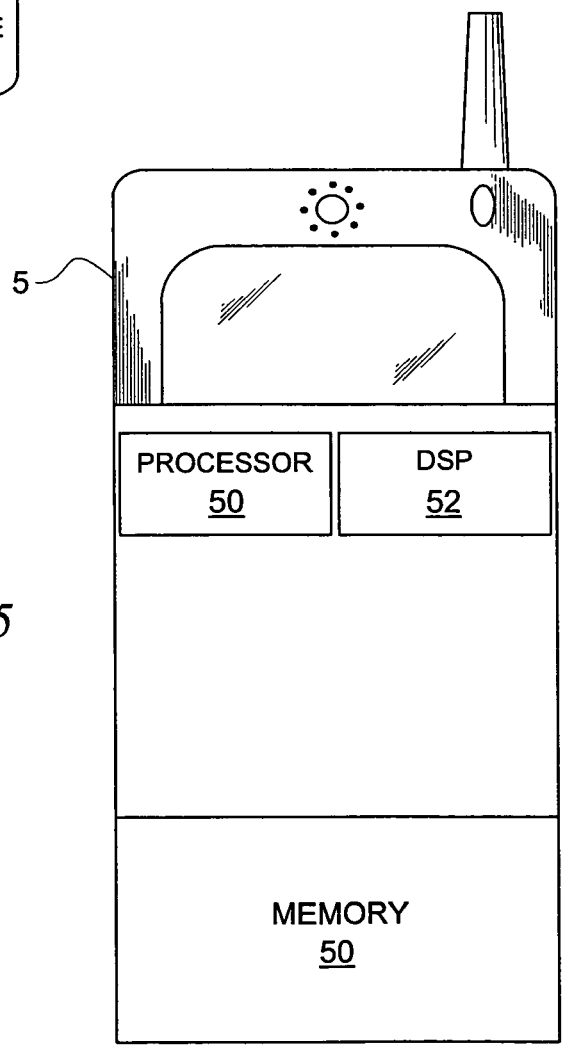
FIG. 5 is a high-level block diagram illustrating the additional features of a communication device compatible with a system according to a preferred embodiment of the present invention.

FIG. 5 illustrates a preferred embodiment communication device compatible with an XIVR system of the present invention. The device represented in FIG. 5 is a mobile telephone. However, it should be noted that various types of communication devices may be adapted to operate with the inventive XIVR system. In addition to the typical equipment found in many communication devices, such as antenna, transducers, displays, etc., mobile phone 5 preferably includes processor 50, digital signal processor (DSP) 52, and memory 51. Traditional mobile phones already have processing units whether programmable, embedded, or application specific. Mobile phone 5 may operate successfully simply by changing the single processor of a traditional phone to a more powerful model. A powerful single process would generally be capable of performing the voice processing features as well as the standard phone features. However, in a preferred embodiment, mobile phone 5 comprises both additional processor 50 and DSP 52 in order to optimize the application execution.

Memory 51 provides storage for the downloaded application logic, response data, reference tables, and/or any other form of data or information used in the execution of a voice response application. With the advances in memory technology, it is possible to place a large amount of memory on a small device with very little power consumption. In fact, the memory may be configured with its own backup power through using an attached battery. In alternative embodiments, small devices, such as phones and hand-held computers may be configured to accept external memory cards such as floppy disks or compact flash-type cards. These small memory units could greatly expand the memory capability of a compatible phone.

It should also be noted that alternative embodiments may be configured to accept external or internal additional processors or memory. In such embodiments, the memory and processor power of such communication devices may be selectively enhanced and/or upgraded.

Figure 6:
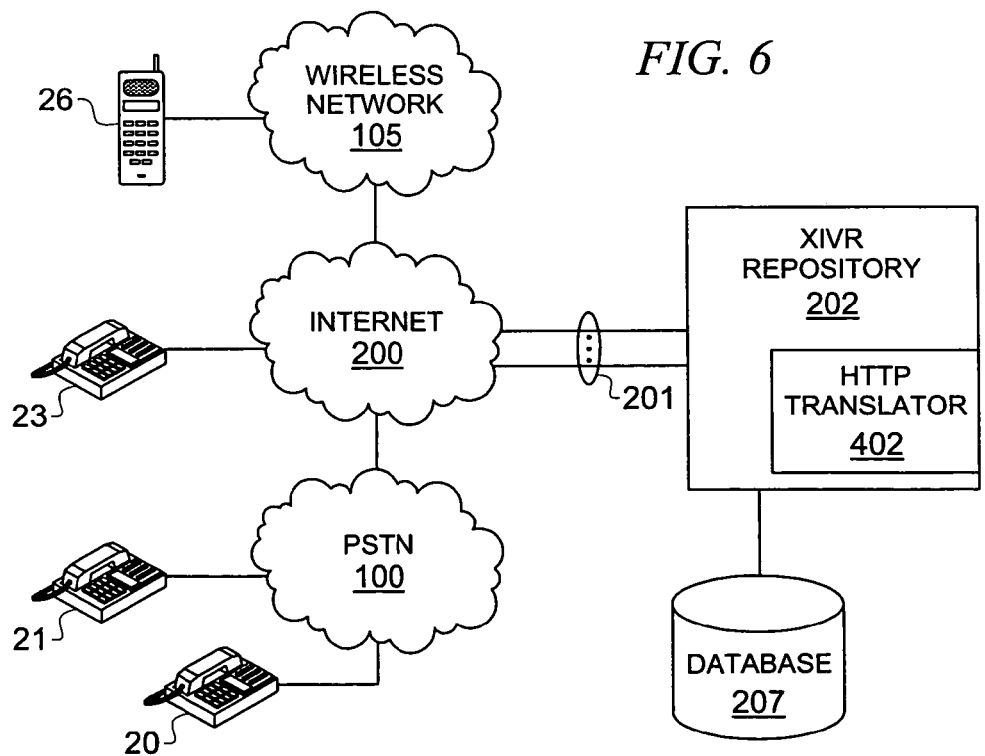
FIG. 6 is a high-level block diagram illustrating an alternative embodiment of the present invention.

FIG. 6 illustrates an alternative embodiment of the present invention configured to provide voice-browsing the Internet. Communication devices 20, 21, 23, and 26 are each phones that typically are not used to browse Internet 200. Mobile phone 26 may be WAP compatible, providing limited access to Internet 200. However, WAP is typically used only with wireless applications, or applications written specifically for WAP-compatible mobile phones, thus not providing full access to available web content. WAP is also browsed exclusively by using keypresses.

In a preferable example of voice-browsing operation, on an alternative embodiment of the present invention, landline phone 20 preferably accesses XIVR server 202 over data connections 201 through PSTN 100 and Internet 200. XIVR server 202 may check database 207 to determine whether phone 20 subscribes to the voice-browsing service. If phone 20 subscribes to voice-browsing, the application logic is preferably downloaded and run on phone 20. The application preferably requests the user to speak/spell the URL of the website to access. Additionally or alternatively, a list of favorites may be stored in a user-accessible database disposed either on the communication device or on a database associated with XIVR server 202. If such a favorites list is disposed on a database associated with XIVR server 202, server 202 would preferably download the list to the communication device at the initialization of each application session. Phone 20 preferably returns the URL to XIVR server 202, which accesses the website through data connections 201. XIVR server 202 preferably retrieves the HTML code for the website and translates it, if necessary, into a compatible language, such as XML or VoiceXML. XIVR server 202 then preferably downloads the web page to phone 20, which begins playing and/or displaying the text and hyperlinks from the accessed site.

In one version of this preferred alternative embodiment, XIVR server 202 may begin translating each of the web pages corresponding to the available hyperlinks on the page downloaded to phone 20. This pre-translation will preferably increase the speed with which phone 20 receives the next web page, if the user chooses one of the hyperlinks. Alternatively, XIVR server 202 may preferably access available counter or statistical software resident on the target web pages to determine the hyperlinks most likely chosen by a user. The alternative predictive voice-browser will preferably make a statistical choice regarding the resources to expend pre-translating web pages.

It should be noted that in the application of the present invention, the communication device may be configured to semi-permanently store the application logic and/or the information retrieved by the voice response application. Thus, a user would preferably not have to re-access the XIVR system to obtain the same data or information. Once a session has been completed, the communication device would have the information and/or the portion of the voice response application available for the user without requiring a renewed connection to the XIVR system. A user obtaining an account balance would therefore be able to recall the balance locally on the phone until such time as either the user or the communication device erases the corresponding memory. Such a data retention policy may be predefined by the communication device manufacturer, the XIVR system provider, and/or the user. Additionally or alternatively, the user may manually choose an option to erase or save such data or application logic.

It should be noted that while the descriptions of the alternative embodiments of the present invention shown in FIGS. 2, 3, and 6 show data connections with XIVR 202 to the Internet, the present invention may also be connected through other data networks. XIVR 202 may operate internally within a company through the company's intranet. Employees would therefore be able to access the XIVR system at work or from mobile locations by calling into the company intranet.

It should further be noted that the preferred embodiment of the present invention is not limited to connecting with mobile communication devices indirectly through either the Internet or the PSTN. As GPRS systems are installed in wireless networks, it will be possible to asynchronously connect directly to the XIVR system. An XIVR configured to directly communicate with a GPRS-enabled mobile device would also preferably incorporate a wireless communication interface equally compatible with the GPRS system.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An interactive multimedia response system comprising:
an application repository having one or more logic applications stored thereon;
a network interface for downloading requested one or more logic applications to a communication device;
wherein said requested one or more logic application is executed locally on said communication device to implement an interactive multimedia response application;
wherein said interactive multimedia response application receives input from a user of said communication device and retrieves information directly from an external resource responsive to said input;
wherein said communications device includes a user interface for accepting said input responsive to said interactive multimedia response application, wherein said input comprises voice commands; and
another application repository having one or more additional logic applications stored thereon, wherein said interactive multimedia response application downloads an additional logic application from said another application repository to said communication device responsive to said input, and wherein said additional logic application is executed locally on said communication device to implement another interactive multimedia response application.

2. The interactive multimedia response system of claim 1 wherein said external resource comprises one or more of:
said application repository;
additional application repositories;
an Internet-connected database;
a data network.

3. The interactive multimedia response system of claim 1 wherein said input further comprises one or more of:
data input;
dual tone multiple frequency (DTMF) input.

4. The interactive multimedia response system of claim 3 further comprising:
voice recognition logic disposed on one or more of:
said communication device;
said application repository.

5. The interactive multimedia response system of claim 1 wherein said requested one or more logic applications are transmitted over a voice connection; and wherein said requested one or more logic applications are downloaded to said communication device over a data connection.

6. The interactive multimedia response system of claim 1 wherein said interactive multimedia response application retrieves said information directly from an external resource over a data connection.

7. The interactive multimedia response system of claim 1 wherein said communication device comprises one or more of:
a mobile phone;
a personal data assistant (PDA);
a land-line phone having at least a processor and a user interface.

8. A method for retrieving information using a communication device, said method comprising:
receiving an interactive voice response computer program at said communication device;
executing, on said communication device, said interactive voice response computer program to implement an information retrieval application through a suspended socket connection;
accessing under control of said received interactive voice response computer program one or more additional external information sources using an information browser residing, at least in part, on said communication device, said accessing responsive to commands received at said communication device from a user;
receiving information from said one or more external information sources at said communication device responsive to said commands;
presenting said received information to said user accessing one or more additional external information sources responsive to user selection, wherein said one or more additional external information sources comprises one or more of an application repository, one or more additional application repositories, a Web server, an Internet-connected database, a data network;
downloading, via a reactivated socket connection, responsive to commands received at said communication device from a user, an additional interactive voice response application logic from one of said one or more additional application repositories to said communication device, and
executing said additional interactive voice response application logic on said communication device to implement another information retrieval service.

9. The method of claim 8 further comprising:
presenting at least a portion of said received information at said communication device wherein said presented information contains one or more hyperlinks to additional information.

10. The method of claim 9 wherein said accessing said one or more additional external information sources is in response to user selection of said one or more hyperlinks.

11. The method of claim 8 wherein said commands comprise one or more of:
voice input;
DTMF input;
electronic input.

12. The method of claim 11 further comprising:
converting said voice input into electronic data for use by said information browser.

13. The method of claim 12 wherein said converting is performed on said communication device.

14. A method for providing information retrieval functionality to a communication device, said method comprising:
- receiving at least one interactive voice response computer program from an application repository remote from said communication device, wherein said at least one interactive voice response computer program can access an information retrieval application available to said communication device;
- said receiving enabled in response to an order from said communication device, wherein said communication device executes said at least one interactive voice response computer program to locally implement said information retrieval application through a suspended socket connection;
- receiving a second interactive voice response computer program from a second application repository responsive to a user interaction with said information retrieval application, wherein said communication device executes said second interactive voice response computer program to locally implement a second information retrieval application; and
- sending from said communication device to a communication network, connected to said communication device, a request from said second information retrieval application for responsive information, wherein said request includes data input into said communication device under control of said user, said data comprising an address to which said request is directed.

15. A method for providing information retrieval functionality to a communication device, said method comprising:
- receiving at said communication device from an application repository at least one interactive voice response computer program responsive to an order from said communication device; and
- executing at least one interactive voice response computer program on said communication device to locally implement an information retrieval application through a suspended socket connection, said executing computing:
- sending via a communication network connected to said communication device a request from said information retrieval application for responsive information;
- wherein said request includes data input into said communication device by a user; and
- wherein said request contains information to cause said communication network to forward said request to an external coupled system responsive to an external resource address associated with said request.

16. The method of claim 15 further comprising:
- receiving at said communication device information responsive to said communication device, said information sent to said device via said network.

17. The method of claim 15 further comprising:
- receiving at said communication device at least one other interactive voice response computer program compatible with said information retrieval application on said communication device,
- wherein said communication device executes at least one of said other interactive voice response computer programs to implement another information retrieval application.

18. The method of claim 15 wherein said data is derived from one or more of:
- voice input;
- dual tone multiple frequency (DTMF) input;
- electronic input.

19. The method of claim 18 wherein said one or more of:
- said voice input, said DTMF input, or said electronic input are converted into said data.

20. The method of claim 19 wherein said conversion takes place on said communication device.

21. The method of claim 15 wherein said receiving is performed over a data connection.

22. The method of claim 21 wherein said request from said communication device is placed over a voice connection.

* * * * *

UNITED STATES PATENT AND TRADEMARK OFFICE
CERTIFICATE OF CORRECTION

| | | |
|---|---|---|
| PATENT NO. | : 7,881,285 B1 | Page 1 of 1 |
| APPLICATION NO. | : 11/418751 | |
| DATED | : February 1, 2011 | |
| INVENTOR(S) | : Dan Hammond | |

It is certified that error appears in the above-identified patent and that said Letters Patent is hereby corrected as shown below:

Line 28 of column 13 that reads "...application..." which should be deleted and replaced with "...applications...."

Signed and Sealed this
Twenty-second Day of March, 2011

David J. Kappos
*Director of the United States Patent and Trademark Office*